United States Patent [19]
Haupt

[11] 3,732,550
[45] May 8, 1973

[54] BISTABLE STORAGE ELEMENT WITH MAGNETIC DATA STORAGE

[75] Inventor: Walter Haupt, Leverkusen, Germany

[73] Assignee: Farbenfabriken Bayer Aktiengesellschaft, Leverkusen, Germany

[22] Filed: Dec. 23, 1970

[21] Appl. No.: 100,885

[30] Foreign Application Priority Data

Jan. 23, 1970 Germany....................P 20 02 936.1

[52] U.S. Cl.....................................340/174 ZB, 340/174 AG, 174 HA, 340/174 BC

[51] Int. Cl. ..........................................G11c 11/04

[58] Field of Search................340/174 AG, 174 BC, 340/174 HA, 2 B, 2 PM; 179/100.2 CH

[56] References Cited

UNITED STATES PATENTS

| | | | |
|---|---|---|---|
| 3,681,768 | 8/1972 | Zelensky | 340/174 AG |
| 3,080,550 | 3/1963 | Kuhot | 340/174 PM |
| 3,287,712 | 11/1966 | Hewitt | 340/174 AG |
| 3,011,064 | 11/1961 | Duinker | 340/174 HA |

*Primary Examiner*—Stanley M. Urynowicz, Jr.
*Attorney*—Burgess, Dinklage & Sprung

[57] ABSTRACT

A bistable storage element with magnetic data storage contains in its magnetic circuit magnetized cores with different coercivities $H_1$ and $H_2$ so that only one core can be remagnetized by an external magnetic field H of the value $H_2<H<H_1$. An air gap is provided in the magnetic circuit within a magnetically controllable semiconductor component.

9 Claims, 2 Drawing Figures

PATENTED MAY 8 1973 3,732,550

INVENTOR:
WALTER HAUPT
By: Burgess, Dinklage & Sprung

BISTABLE STORAGE ELEMENT WITH MAGNETIC DATA STORAGE

This invention relates to a bistable storage element with magnetic data storage without movable parts.

For control problems, data-storing components or groups of components are frequently required which retain their data with failure of the auxiliary power. In the relay art, such components exist in the form of polarized relays, in which stable states are maintained by permanent magnets. However, it is a disadvantage here that a change-over can only be effected by a mechanical movement of a movable part. On the other hand, the magnet core stores which are known from digital computers and in which the direction of magnetization of hard magnet materials is read, operate entirely without mechanically moved parts. The disadvantage here is the high cost of the external circuitry and the fact that usually the reading can only be by pulses. Such data stores are therefore only economic with high store capacity.

A storage element with magnetic data storage has now been developed in which the magnet circuit contains according to the invention two magnetic cores of materials of different magnetic hardness and with different coercivities $H_1$ and $H_2$, of which only one is capable of being remagnetized by an external magnetic field H of the value $H_1 < H < H_2$. The magnetic circuit is moreover interrupted by an air gap, in which is arranged a magnetically controllable semiconductor component. For increasing the magnetic flux in the air gap, a soft magnetic yoke can be provided in known manner in the magnetic circuit.

The advantage of the storage element according to the invention consists in that the circuit on the control side is a simple circuit, as with a polarized relay, and that no mechanically moved parts are necessary.

One embodiment of the invention is known by way of example in the drawing and is hereinafter more fully described. In the drawing.

Figure 1:
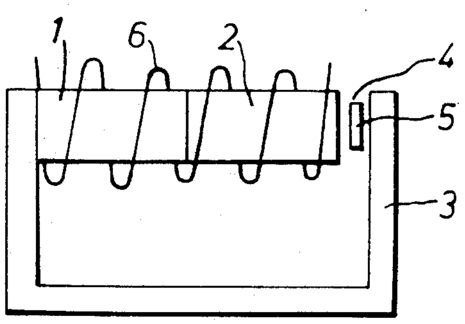
FIG. 1 shows a magnetic circuit arrangement.
Figure 2:
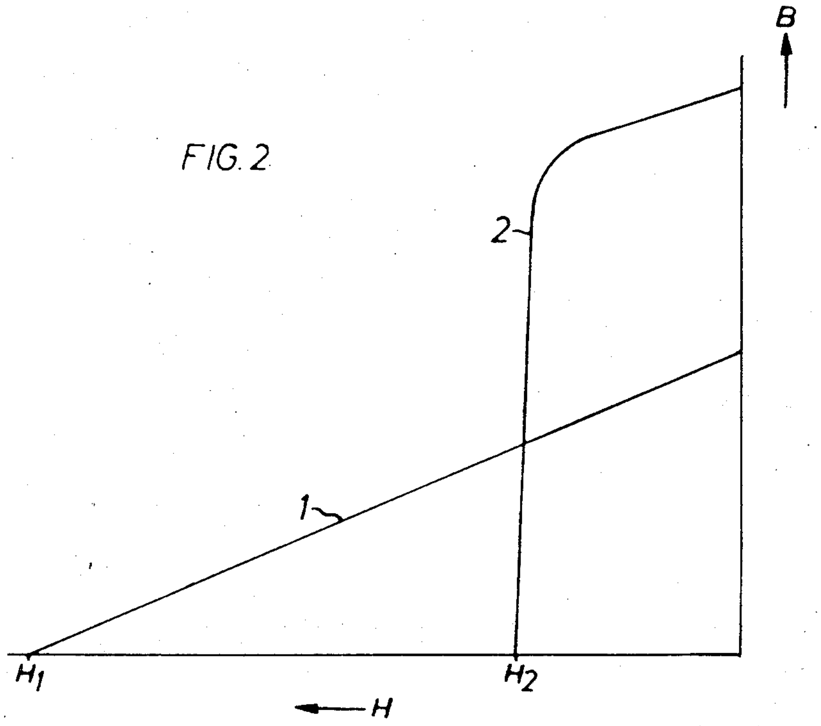
FIG. 2 shows hysteresis curves of the magnetic materials being used.

The magnetic circuit of the storage element is formed from two magnets 1 and 2, a soft magnetic yoke 3 and an air gap 4. Arranged in the air gap is a semiconductor component 5 which is dependent upon a magnetic field. The magnet 1 has a high coercivity $H_1$ and, in the second quadrant of the hysteresis loop, a relative permeability of about 1. The magnet 2, on the other hand, has a substantially smaller coercivity field strength $H_2$ and an approximately rectangular hysteresis loop.

The two directions of magnetization of the magnet 2 represents the bistable states. If both magnets are magnetized in the same direction, the induction in the air gap 4 is at its maximum. If the magnet 2 is remagnetized, the induction in the air gap 4 is substantially smaller. With favorable dimensioning of the magnet arrangement, the induction is practically zero. The remagnetization can be effected by a field winding 6 or a permanent magnet introduced from outside. For the static reading of the two stable states, a semiconductor component 5 which is dependent on magnetic fields is used. Especially suitable for this purpose are, for example, Hall probes or indium antimonide field probes.

I claim:

1. A bistable storage element with magnetic data storage, without movable parts, characterized in that the magnetic circuit contains two magnetized cores of magnetic materials with different coercivities $H_1$ and $H_2$ ($H_1 > H_2$), one of which is permanently magnetized, and of which only one can be remagnetized by an external magnetic field H of the value $H_2 < H < H_1$, and that an air gap is provided in the magnetic circuit, a magnetically controllable semiconductor component being arranged in said air gap.

2. A storage element according to claim 1, characterized in that the magnetic circuit contains in known manner a soft magnetic yoke for increasing the magnetic flux.

3. A storage element according to claim 2, one of the cores being permanently magnetized, set cores being disposed in coaxial abutting relation, there being a single field winding for the cores for the remagnetization.

4. A storage element according to claim 1, characterized in that said cores are disposed in axial alignment.

5. A storage element according to claim 4, comprising a single field winding for the cores for remagnetization thereof.

6. A storage element according to claim 1, characterized in that said cores are disposed coaxially in abutting relation.

7. A storage element according to claim 6, comprising a single field winding for the cores for remagnetization thereof.

8. A storage element according to claim 1, comprising a single field winding for the cores for remagnetization thereof.

9. A magnetic circuit comprising:

a. a first core having a permanent and irreversible magnetization, b. a second core connected in series with the first core, the magnetization of the second core being reversible by an externally applied magnetic field, c. a gap in the circuit containing a magnetically controllable semiconductor component, d. means for applying an external magnetic field to the circuit.

* * * * *